US012722570B2

(12) United States Patent
Nania

(10) Patent No.: US 12,722,570 B2
(45) Date of Patent: Sep. 1, 2026

(54) DEPLOYABLE STEP ASSEMBLY FOR VEHICLE

(71) Applicant: Ford Global Technologies, LLC, Dearborn, MI (US)

(72) Inventor: Adrian Nania, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 341 days.

(21) Appl. No.: 18/544,898

(22) Filed: Dec. 19, 2023

(65) Prior Publication Data

US 2025/0196775 A1 Jun. 19, 2025

(51) Int. Cl.
*B60R 3/02* (2006.01)
*B60Q 1/24* (2006.01)

(52) U.S. Cl.
CPC ................ *B60R 3/02* (2013.01); *B60Q 1/247* (2022.05)

(58) Field of Classification Search
CPC .. B60R 3/02; B60R 3/00; B60R 19/48; B60R 3/007; B60Q 1/247
See application file for complete search history.

(56) References Cited

U.S. PATENT DOCUMENTS 5,678,872 A * 10/1997 Slater ...................... B60R 19/48 293/118
6,250,785 B1 * 6/2001 Mallia ..................... B60R 3/002 362/555
7,377,563 B1 * 5/2008 Demick .................. B60R 19/48 280/166
7,434,825 B2 * 10/2008 Williams .................. B60R 3/02 280/166
7,621,546 B2 * 11/2009 Ross ...................... B60Q 1/325 280/727
9,434,317 B2 * 9/2016 Nania ....................... B60R 3/02
9,783,100 B2 * 10/2017 Salter ........................ F21V 7/06
2008/0106106 A1 * 5/2008 Lavoie ...................... B60R 3/02 293/117
2022/0314888 A1 10/2022 Glickman et al.
2023/0256891 A1 8/2023 Harmon et al.

FOREIGN PATENT DOCUMENTS

EP 0885776 A1 * 12/1998 ............... B60D 1/54
JP H08198014 A * 8/1996

OTHER PUBLICATIONS

EP-0885776-A1 English Translation (Year: 1998).*
JP-H08198014-A English Translation (Year: 1996).*

* cited by examiner

*Primary Examiner* — Michael T. Walsh
(74) *Attorney, Agent, or Firm* — Vichit Chea; Carlson, Gaskey & Olds, P.C.

(57) ABSTRACT

A vehicle assembly includes a bumper of a vehicle and a deployable step assembly that is pivotable back-and-forth between a stowed position and a deployed position relative to the bumper. When in the stowed position, a step pad of the deployable step assembly is received within a bumper pocket of the bumper. When in the deployed position, the step pad is rearward and vertically lower than the bumper.

20 Claims, 6 Drawing Sheets

18
12
A 2
16
10
O
36
20
14
16
24
82

44
22
34
60
50
38
58
L
18
12
A 2
16
10
O
36
20
14
16
24
54
82
44
22
34
78
50
60
58

104
80
60
50
72
70
64
106
82
86
G
66
62
102
90
L
L
L 100
64
L
L
106
L
L
66
102
62
70
60
72

72
60
60
70
102
62
90

104
64
106

DEPLOYABLE STEP ASSEMBLY FOR VEHICLE

TECHNICAL FIELD

This disclosure relates to motor vehicles and, more particularly, to deployable step assemblies for accessing vehicle cargo spaces.

BACKGROUND

Many motor vehicles include cargo spaces for transporting various types of cargo. A pickup truck, for example, includes a cargo bed that establishes the cargo space of the truck. A tailgate typically encloses one end of the cargo bed. The tailgate is movable between closed and open positions for accessing the cargo bed. Steps have been proposed to assist a user when accessing cargo spaces. Some steps require multiple manipulations to transition the step to a use position.

SUMMARY

In some aspects, the techniques described herein relate to a vehicle, including: a bumper of a vehicle; and a deployable step assembly that is pivotable back-and-forth between a stowed position and a deployed position relative to the bumper, when in the stowed position, a step pad of the deployable step assembly is received within a bumper pocket of the bumper, when in the deployed position, the step pad is rearward and vertically lower than the bumper.

In some aspects, the techniques described herein relate to a vehicle, further including a hitch tube that extends in cross-width direction of the vehicle and is a component of a vehicle body of the vehicle, the deployable step assembly pivoting about a pivot axis that is directly vertically beneath the hitch tube.

In some aspects, the techniques described herein relate to a vehicle, further including a collar bracket disposed about the hitch tube, the deployable step assembly pivotably coupled to the collar bracket.

In some aspects, the techniques described herein relate to a vehicle, further including at least one mechanical fastener that secures the collar bracket to the hitch tube, the deployable step assembly spanning over the at least one mechanical fastener when the deployable step assembly is in the stowed position.

In some aspects, the techniques described herein relate to a vehicle, wherein the deployable step assembly transitions from the stowed position to the deployed position exclusively by pivoting.

In some aspects, the techniques described herein relate to a vehicle, wherein the deployable step assembly is at least partially received within a bumper pocket when the deployable step assembly is in the stowed position.

In some aspects, the techniques described herein relate to a vehicle, wherein a top surface of the bumper spans over the bumper pocket and spans over the deployable step assembly when the deployable step assembly is in the stowed position.

In some aspects, the techniques described herein relate to a vehicle, further including a light within the bumper pocket, the light configured to illuminate at least the step pad of the deployable step assembly when the deployable step assembly is in the deployed position.

In some aspects, the techniques described herein relate to a vehicle, wherein the deployable step assembly spans over the light when the deployable step assembly is in the stowed position.

In some aspects, the techniques described herein relate to a vehicle, wherein the light is configured to emit light to illuminate ground beneath the deployable step assembly when the deployable step assembly is in the stowed position.

In some aspects, the techniques described herein relate to a vehicle, further including a catch assembly that can engage to hold the deployable step assembly in the stowed position, and can disengage to permit pivoting of the deployable step assembly from the stowed position to the deployed position.

In some aspects, the techniques described herein relate to a vehicle, wherein the deployable step assembly includes an activation button configured to release the catch assembly from an engaged position to permit the deployable step assembly to pivot from the stowed position to the deployed position.

In some aspects, the techniques described herein relate to a vehicle, wherein the activation button is configured to be activated with a foot of a user.

In some aspects, the techniques described herein relate to a vehicle, wherein the deployable step assembly is outboard of a bumper step of the bumper.

In some aspects, the techniques described herein relate to a vehicle, wherein the vehicle is a pickup truck that includes a cargo bed.

In some aspects, the techniques described herein relate to a vehicle, wherein the step pad includes a stepping pad and a cover, the step pad concealed by the cover when the deployable step assembly is in the stowed position, the step pad establishing a step surface when the deployable step assembly is in the deployed position.

In some aspects, the techniques described herein relate to a vehicle, further including a biasing device that damps pivoting of the deployable step assembly from the stowed position to the deployed position and that assists pivoting of the deployable step assembly from the deployed position to the stowed position.

In some aspects, the techniques described herein relate to a method, including: pivoting a deployable step assembly of a vehicle to transition the deployable step assembly from a stowed position and a deployed position, wherein, in the stowed position, a step pad of the deployable step assembly establishes a portion of a bumper of the vehicle, wherein, in the deployed position, the step pad is rearward and vertically lower than the bumper.

In some aspects, the techniques described herein relate to a method, further including covering a light with the deployable step assembly when the deployable step assembly is in the stowed position, the light illuminating at least a portion of the deployable step assembly when the deployable step assembly is in the deployed position.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

Figure 1:
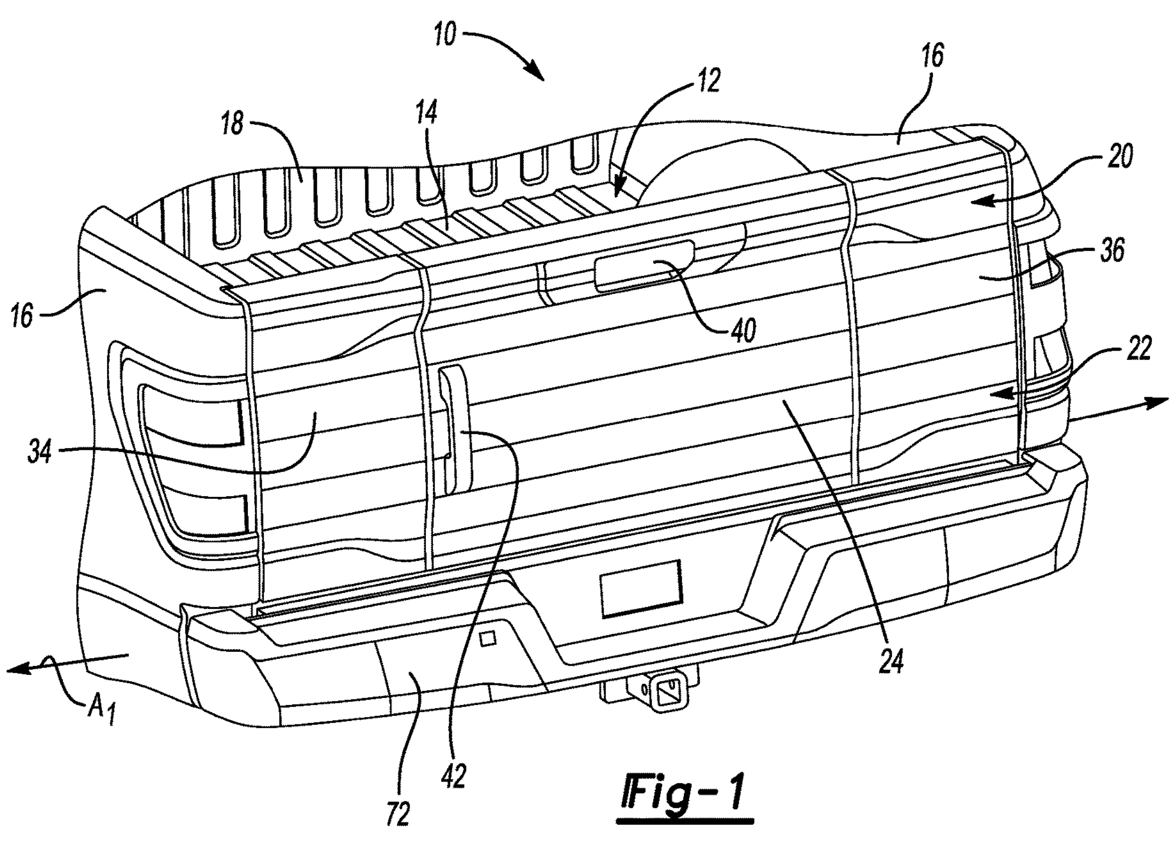
FIG. 1 is a rear perspective view of a motor vehicle equipped with a cargo space and a tailgate assembly positioned in a tailgate closed position relative to the cargo space.

This disclosure details examples of deployable step assemblies that can be used to help a user access vehicle cargo spaces. An exemplary deployable step assembly is pivotable back-and-forth between a stowed position and a deployed position. In the stowed position, a step pad of the deployable step assembly establishes a portion of a bumper, and in the deployed position, the step pad is rearward and vertically lowered relative to the bumper. These and other features of this disclosure are described in greater detail below.

FIGS. 1, 2, 3, and 4 illustrate select portions of a vehicle 10 that includes a cargo space for storing and/or hauling one or more items of cargo. In the illustrated embodiment, the vehicle 10 is a pickup truck and the cargo space is established by a cargo bed 12 of the pickup truck. While a pickup truck with a cargo bed is specifically depicted and referenced herein, other vehicles having other types of cargo spaces could also benefit from the teachings of this disclosure.

The vehicle 10 could be a conventional, internal combustion engine powered vehicle, a traction battery powered electric or hybrid vehicle, an autonomous vehicle (i.e., a driverless vehicle), etc.

Although a specific component relationship is illustrated in the figures of this disclosure, the illustrations are not intended to limit this disclosure. The placement and orientation of the various components of the vehicle 10 are shown schematically and could vary within the scope of this disclosure. In addition, the various FIGS. accompanying this disclosure are not necessarily drawn to scale, and some features may be exaggerated or minimized to emphasize certain details of a particular component.

The cargo bed 12 is generally rearward of a passenger cabin (not shown) of the vehicle 10 and includes a bed floor 14 extending between a pair of longitudinally extending side walls 16, a laterally extending front wall 18, and a tailgate assembly 20. The overall size, shape, and configuration of the cargo bed 12 are not intended to limit this disclosure.

The tailgate assembly 20 may include, among other things, a frame subassembly 22 and a door subassembly 24. The door subassembly 24 may sometimes be referred to as a "swing gate subassembly." The frame subassembly 22 may include a driver side section 34, a passenger side section 36, and a connection member 38 (see FIG. 3) connected between the driver side section 34 and the passenger side section 36. The door subassembly 24 may be connected to either the driver side section 34 or the passenger side section 36 by a hinge assembly.

Figure 2:
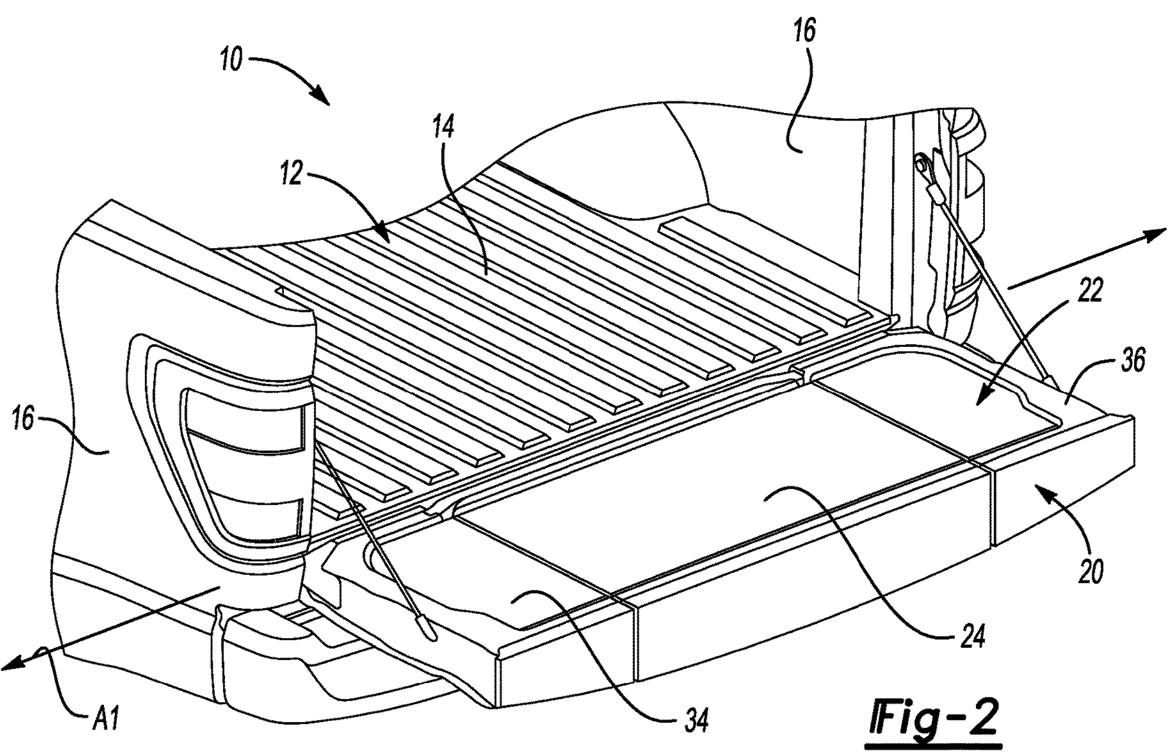
FIG. 2 illustrates the tailgate assembly of FIG. 1 in a tailgate open position.

The tailgate assembly 20 is pivotable about a first axis $A_1$ relative to the cargo bed 12 between a tailgate closed position shown in FIG. 1 and a tailgate open position shown in FIG. 2. The tailgate assembly 20 may be moved from the tailgate closed position to the tailgate open position in response to actuating a first handle 40 of the tailgate assembly 20, for example. The tailgate assembly 20 is vertically aligned when in the tailgate closed position and thus generally encloses an end of the cargo bed 12 that is opposite from the front wall 18, and the tailgate assembly 20 is horizontally aligned when in the tailgate open position and thus generally allows access to the cargo bed 12. Vertical and horizontal, for purposes of this disclosure, are with reference to ground in the ordinary orientation of the vehicle 10 during operation.

The door subassembly 24 of the tailgate assembly 20 is in a door closed position and is secured to the frame subassembly 22 when the frame subassembly 22 and the door subassembly 24 are pivoted between the tailgate closed position and the tailgate open position. Thus, the frame subassembly 22 and the door subassembly 24 pivot together as a unit when the tailgate assembly 20 is transitioned back and forth between the tailgate closed position and the tailgate open position.

Figures 3, 4:
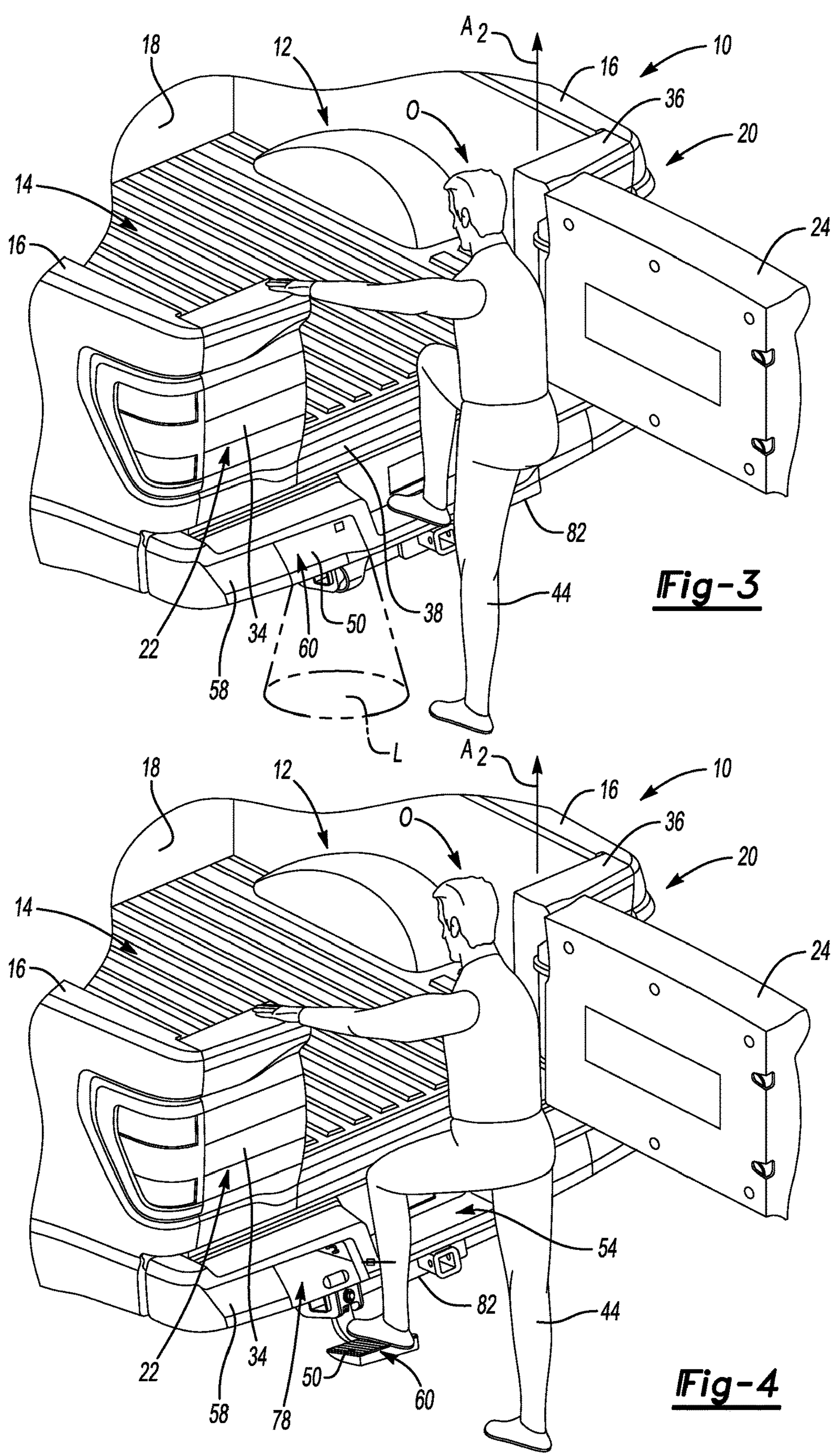
FIG. 3 illustrates a door subassembly of the tailgate assembly of FIG. 1 in a door open position and a deployable step assembly in a stowed position according to an exemplary embodiment of the present disclosure.
FIG. 4 illustrates the door subassembly of the tailgate assembly of FIG. 1 in the door open position and the example deployable step assembly in a deployed position.

When in the tailgate closed position, the door subassembly 24 is pivotable relative to the frame subassembly 22 about a second axis $A_2$ between the door closed position shown in FIG. 1 and a door open position shown in FIGS. 3 and 4. In an embodiment, the first axis $A_1$ is a horizontally extending axis, and the second axis $A_2$ is transverse to the first axis $A_1$ and is a vertically extending axis. The door subassembly 24 may be moved between the door closed position and the door open position by grasping a second handle 42 (see FIG. 1) of the tailgate assembly 20, for example.

The door subassembly 24 provides a cargo bed access opening O when moved to the door open position. In an embodiment, the cargo bed access opening O extends vertically downward at least as far as the bed floor 14 of the cargo bed 12. A user 44 can access the cargo bed 12 through the cargo bed access opening O when the door subassembly 24 in positioned in the door open position. Placing the door subassembly 24 in the door open position allows the user 44 to move closer to the cargo bed 12 than, for example, when the tailgate assembly 20 is positioned in the tailgate open position of FIG. 2.

The cargo bed access opening O can also provide clearance for the user 44 to enter the cargo bed 12 to, for example, load or retrieve cargo. In this example, the user 44 is provided with assistance for stepping up and accessing the cargo bed 12 from the ground. This disclosure is directed to systems and methods that assist the user 44 when accessing the cargo bed 12.

With reference now to FIGS. 5-12, in the exemplary embodiment, a deployable step assembly 50 can be deployed to assist the user 44 when accessing the cargo bed 12 with the door subassembly 24 is moved to the door open position shown in FIGS. 3 and 4. The user 44 could also utilized the deployable step assembly 50 when the tailgate assembly 20 is in the tailgate closed position of FIG. 1. The user 44 can utilize the deployable step assembly 50 as a lower, first step.

The user 44 can utilize a bumper step 54 within a bumper 58 of the vehicle 10 as an upper, second step. Having an upper and a lower step can be particularly useful if the bed floor 14 is elevated due to the style or size of the vehicle 10.

The deployable step assembly 50 includes a step pad 60, a connection arm 62, a liner 64, and a collar bracket 66. The step pad 60 has a stepping platform 70 and a cover portion 72. Mechanical fasteners, such as screws, can join the stepping platform 70 to the cover portion 72.

Figure 5:
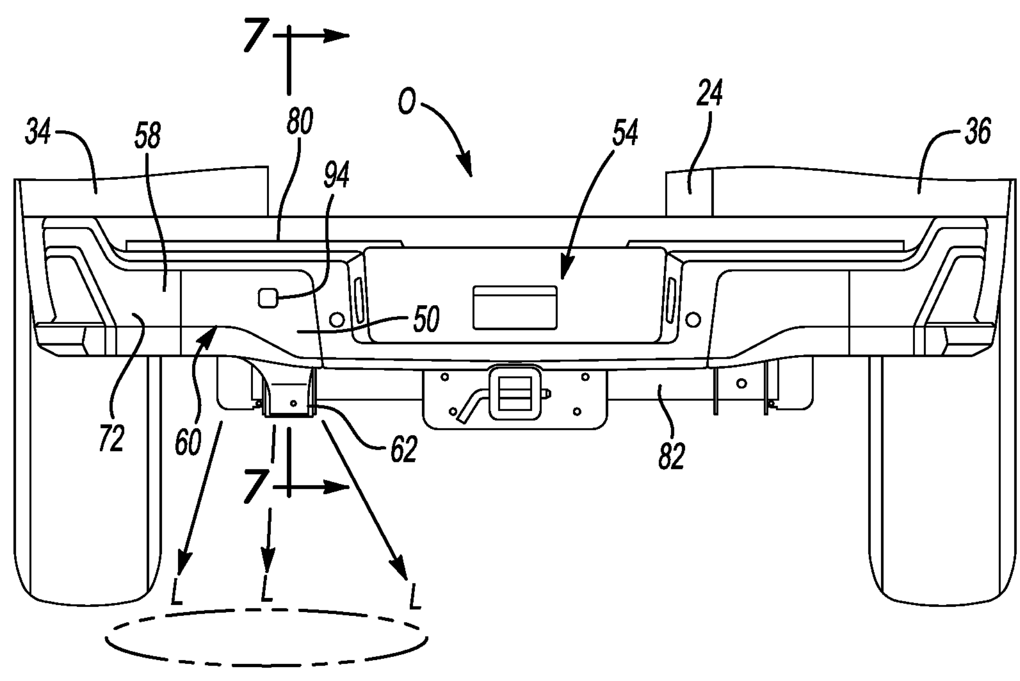
FIG. 5 illustrates a rear view of selected portions of FIG. 3.
Figure 6:
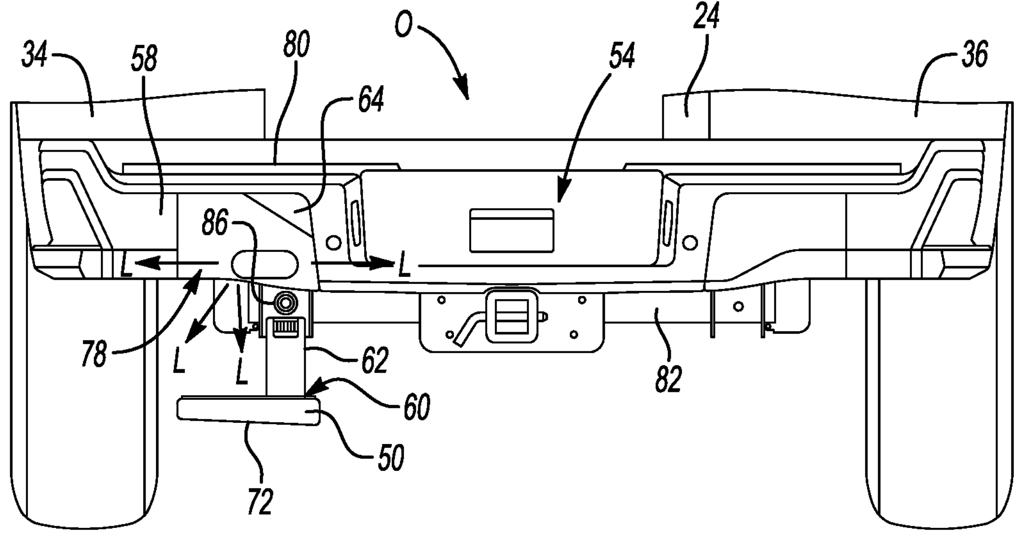
FIG. 6 illustrates a rear view of selected portions of FIG. 4.

The deployable step assembly 50 is pivotable back-and-forth between the stowed position shown in FIGS. 3 and 5, and the deployed position of FIGS. 4 and 6. When in the stowed position, the step pad 60 is received within a bumper pocket 78 of the bumper 58. The bumper pocket 78 has a driver side, a passenger side, and a top side 80. When the deployable step assembly 50 is in the stowed position, the top side 80 extends directly over the step pad 60.

When in the stowed position, the cover portion 72 is visible when the vehicle 10 is viewed from behind. The cover portion 72 can be color matched to the surrounding areas of the bumper 58 to conceal the step pad 60. The step pad 60 can function as part of the bumper 58 when the deployable step assembly 50 is in the stowed position.

When in the deployed position, the step pad 60 is rearward and vertically lower than the bumper 58. When in the deployed position, the user 44 can step on the stepping platform 70 of the step pad 60 to assist the user 44 when accessing the cargo bed 12.

In the example embodiment, the deployable step assembly 50 is disposed outboard of the bumper step 54. Positioning the deployable step assembly 50 in this area can facilitate use of the deployable step assembly 50 as a step even when the vehicle 10 is towing an item, such as a trailer.

In another embodiment, the deployable step assembly 50 is mounted at a location on the opposite side of the bumper step 54 from the location shown (i.e., on the passenger side of the vehicle 10). In yet another embodiment, two deployable step assemblies 50 could be provided-one on each side of the bumper step 54.

The deployable step assembly 50 is coupled to a hitch tube 82 of the vehicle 10, which extends in a cross-width direction of the vehicle 10 and is a component of a vehicle body of the vehicle 10. The hitch tube 82 is an integral component of a vehicle body structure of the vehicle 10 and supports the bumper 58. The hitch tube 82 extends in an embodiment across a majority of the width of the bumper 58.

The example deployable step assembly 50 is pivotably coupled to the hitch tube 82. In particular, the collar bracket 66 is disposed about the hitch tube 82 and secured to the hitch tube 82 with a mechanical fastener 86. The connection arm 62 is pivotably coupled to the collar bracket 66 with a pivot pin 90. The collar bracket 66 can be secured between vertically extending flanges of the hitch tube 82, which can help to stability the deployable step assembly 50 when the user 44 steps on the stepping platform 70.

The connection arm 62 and the stepping platform 70 are, in this example, parts of the same continuous structure. The connection arm 62 and stepping platform 70 can be cast from a metal or metal alloy. The cover portion 72 can be a polymer based material.

When in the stowed position, the connection arm 62 spans over the mechanical fastener 86, which hides the mechanical fastener 86 when the vehicle 10 is viewed from behind and thereby enhances aesthetics.

The deployable step assembly 50, in this example, additionally include an activation button 94 and a catch assembly 98. The activation button 94 can be accessible through an opening in the cover portion 72 when the deployable step assembly 50 is in the stowed position. The activation button 94 may be slightly recessed relative to an exterior surface of the cover portion 72 to protect the activation button 94 from ricocheting objects (e.g., rocks, stones, debris, etc.). The activation button 94 may be moved in a direction toward the hitch tube 82 to release the catch assembly 98 and disengaged the catch assembly 98.

The catch assembly 98 can engage a striker 100 mounted to the liner 64 to hold the deployable step assembly 50 in the stowed position. The striker 100 can extend through an opening in the stepping platform 70 engage with the catch assembly 98, which can be housed between the stepping platform 70 and the cover portion 72.

When the catch assembly 98 is engaged, the catch assembly 98 holds the step pad 60 in the stowed position. In some examples, the user 44 can use their foot to press the activation button 94 and release the catch assembly 98. The user could instead, or additionally, move the activation button 94 using their hand.

When the deployable step assembly 50 is in the stowed position, the catch assembly 98 is engaged to hold the deployable step assembly 50. When the activation button 94 is activated, the catch assembly 98 releases. The deployable step assembly 50 then, due to gravity, pivot downward to the deployed position.

A biasing device, here a tension spring 102 disposed about the pivot pin 90, can slow the rotation of the deployable step assembly 50 to the deployed position. The tension spring 102 can also assist movement of the deployable step assembly 50 from the deployed position back to the stowed position.

Notably, no extension or movement of the deployable step assembly 50 other than pivoting movement is needed to transition the deployable step assembly 50 from the stowed position to the deployed position. The deployable step assembly 50 can transition from the stowed position to the deployed position exclusively by pivoting.

The liner 64 fits within the bumper pocket 78 and is exposed and visible when the deployable step assembly 50 is in the deployed position. A liner bracket 104 can be used to secure the liner 64 into the installed position.

In this example, a light 106 is mounted to the liner. The light 106 is configured to emit light L to illuminate at least the step pad 60 when the deployable step assembly 50 is in the deployed position. As the light 106 is within the liner 64 and within the bumper pocket 78, the deployable step assembly 50 covers the light 106 when the deployable step assembly 50, which can contribute to an aesthetically pleasing appearance when the vehicle 10 is viewed from behind.

Figures 7, 8:
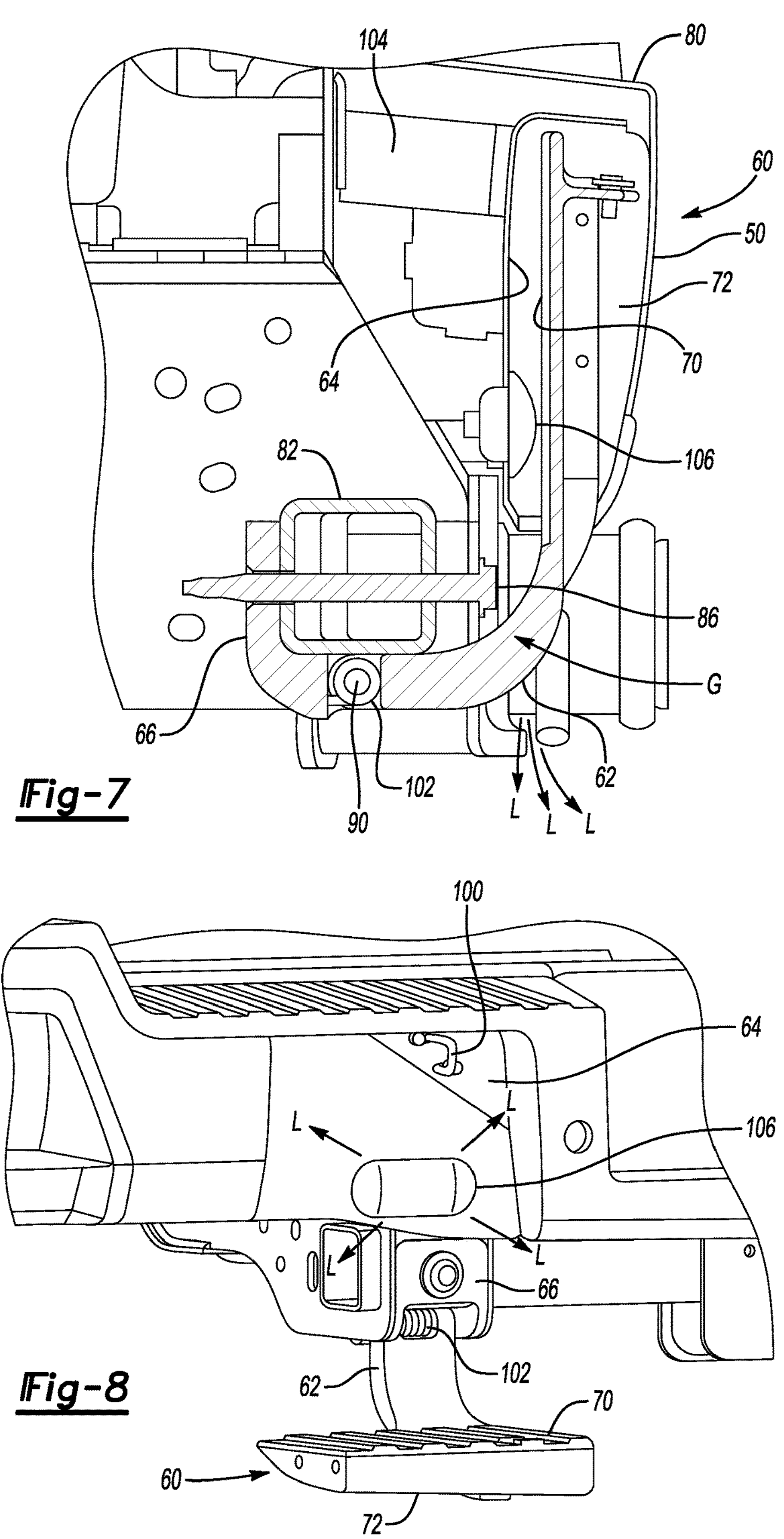
FIG. 7 is a sectional view of the example deployable step assembly taken at line 7-7 in FIG. 5.
FIG. 8 illustrates a close-up perspective view of the example deployable step assembly in the deployed position of FIG. 6.
Figure 9:
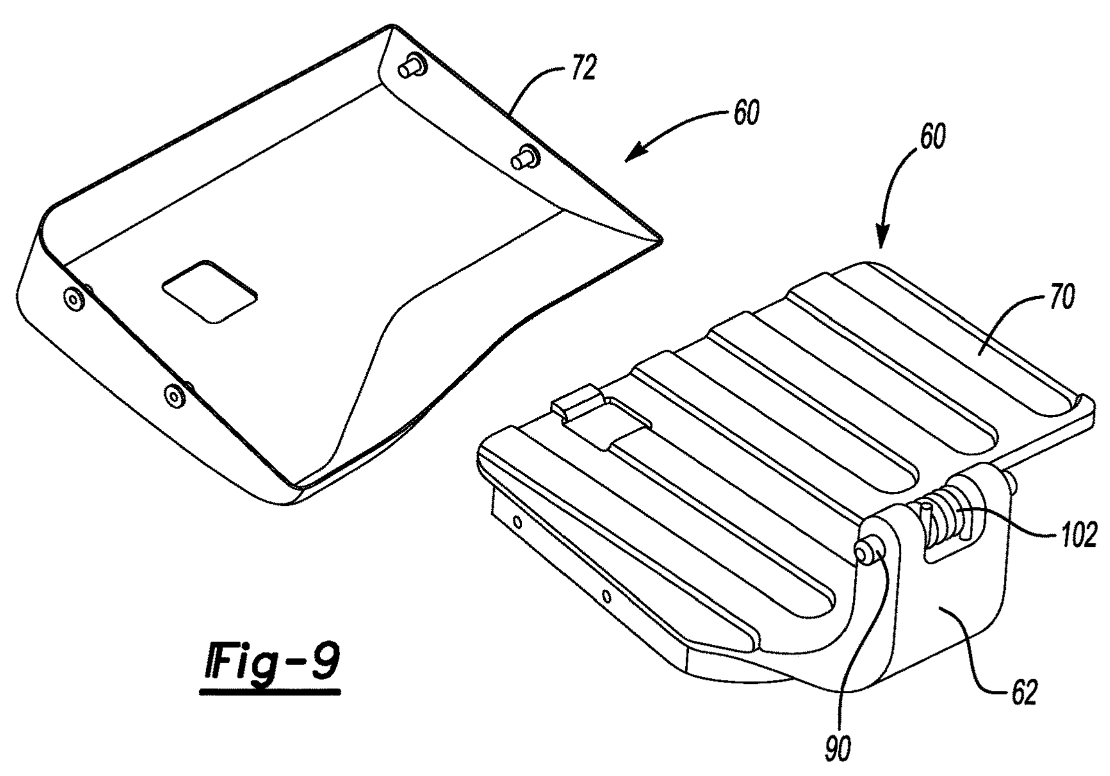
FIG. 9 illustrates an expanded perspective view of a step pad from the example deployable step assembly.
Figure 10:
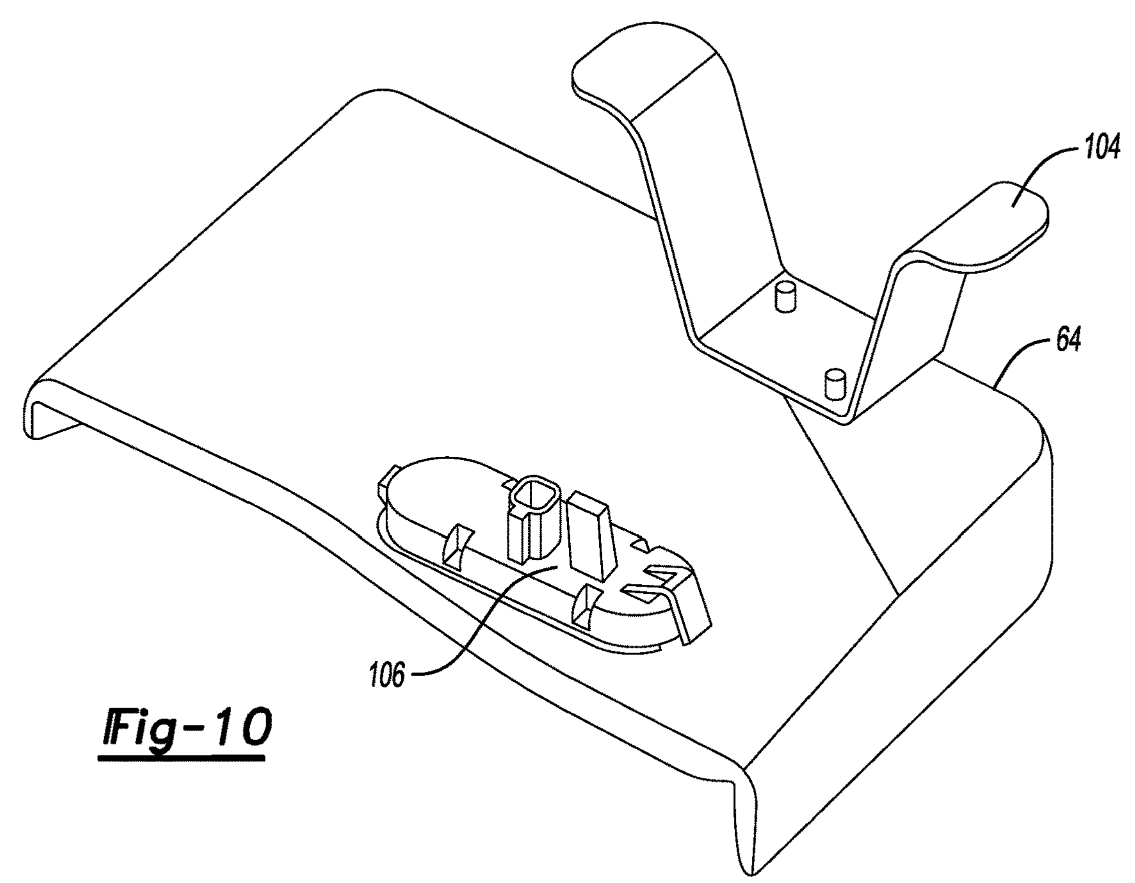
FIG. 10 illustrates a rear perspective view of a liner used in connection with the example deployable step assembly.
Figure 11:
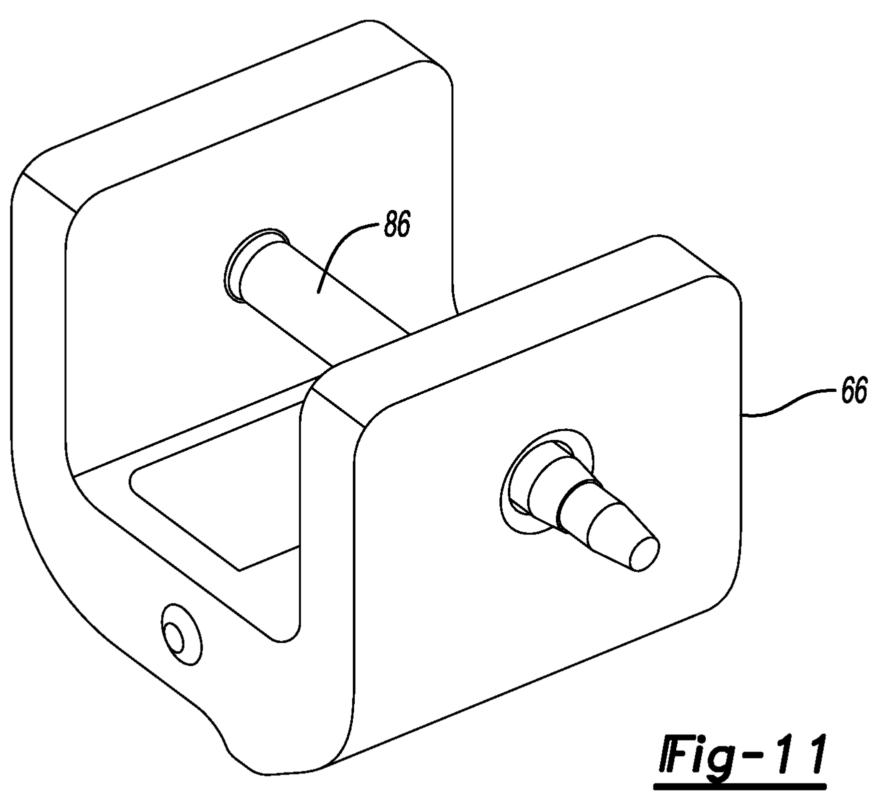
FIG. 11 illustrates a perspective view of a collar bracket from the example deployable step assembly.
Figure 12:
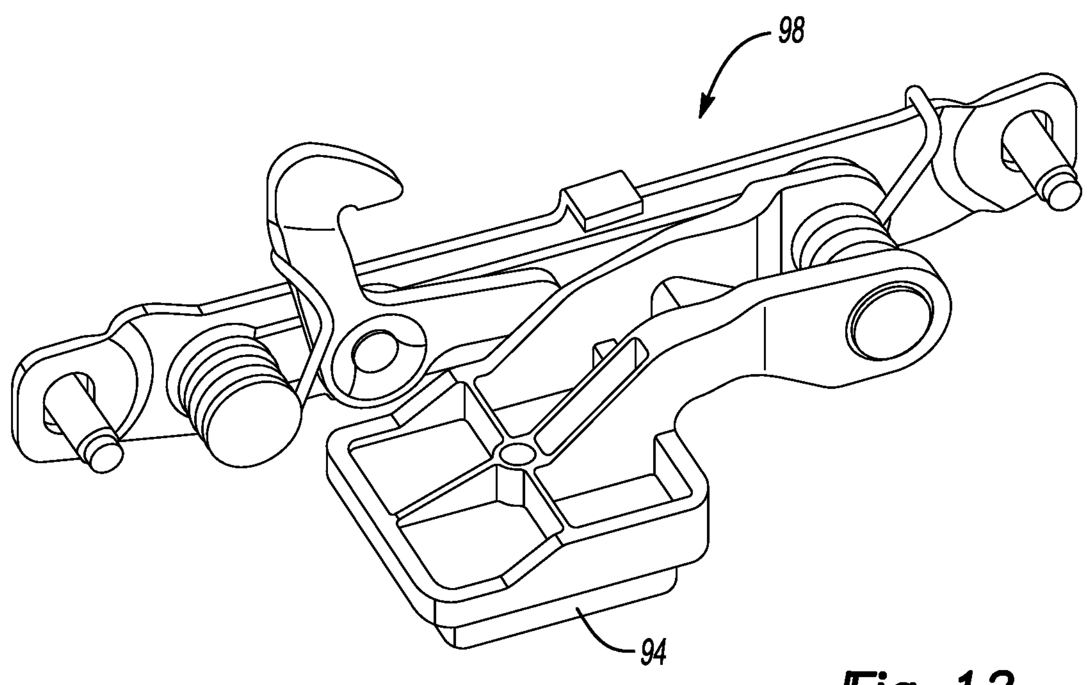
FIG. 12 illustrates a perspective view of a catch and actuation button from the example deployable step assembly.

Notably, as shown in FIG. 7, the deployable step assembly 50 in the stowed position is spaced such that there is a gap G opening vertically downward from an area between the light 106 and the step pad 60. When the deployable step assembly 50 is in the stowed position, the light 106 can be activated to emit light L that moves through the gap G to illuminate the ground and other areas beneath the deployable step assembly 50. Illuminating these areas can help the user

44 located the activation button 94. The light 106 may activate in response to the user 44 moving to an area near the deployable step assembly 50.

The deployable step assemblies of this disclosure provide solutions for improving access to vehicle cargo spaces. The exemplary deployable step assemblies provide less complex and more effective stepping solutions for accessing and utilizing the cargo spaces. The deployable step provides a lower step while a bumper step provides an upper step.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle, comprising:

a bumper of a vehicle; and a deployable step assembly that is pivotable back-and-forth between a stowed position and a deployed position relative to the bumper, when in the stowed position, a step pad of the deployable step assembly is received within a bumper pocket of the bumper, when in the deployed position, the step pad is rearward and vertically lower than the bumper.

2. The vehicle of claim 1, further comprising a hitch tube that extends in cross-width direction of the vehicle and is a component of a vehicle body of the vehicle, the deployable step assembly pivoting about a pivot axis that is directly vertically beneath the hitch tube.

3. The vehicle of claim 2, further comprising a collar bracket disposed about the hitch tube, the deployable step assembly pivotably coupled to the collar bracket.

4. The vehicle of claim 3, further comprising at least one mechanical fastener that secures the collar bracket to the hitch tube, the deployable step assembly spanning over the at least one mechanical fastener when the deployable step assembly is in the stowed position.

5. The vehicle of claim 1, wherein the deployable step assembly transitions from the stowed position to the deployed position exclusively by pivoting.

6. The vehicle of claim 1, wherein the deployable step assembly is at least partially received within a bumper pocket when the deployable step assembly is in the stowed position.

7. The vehicle of claim 6, wherein a top surface of the bumper spans over the bumper pocket and spans over the deployable step assembly when the deployable step assembly is in the stowed position.

8. The vehicle of claim 6, further comprising a light within the bumper pocket, the light configured to illuminate at least the step pad of the deployable step assembly when the deployable step assembly is in the deployed position.

9. The vehicle of claim 8, wherein the deployable step assembly spans over the light when the deployable step assembly is in the stowed position.

10. The vehicle of claim 9, wherein the light is configured to emit light to illuminate ground beneath the deployable step assembly when the deployable step assembly is in the stowed position.

11. The vehicle of claim 1, further comprising a catch assembly that can engage to hold the deployable step assembly in the stowed position, and can disengage to permit pivoting of the deployable step assembly from the stowed position to the deployed position.

12. The vehicle of claim 11, wherein the deployable step assembly includes an activation button configured to release the catch assembly from an engaged position to permit the deployable step assembly to pivot from the stowed position to the deployed position.

13. The vehicle of claim 12, wherein the activation button is configured to be activated with a foot of a user.

14. The vehicle of claim 1, wherein the deployable step assembly is outboard of a bumper step of the bumper.

15. The vehicle of claim 1, wherein the vehicle is a pickup truck that includes a cargo bed.

16. The vehicle of claim 1, wherein the step pad includes a stepping pad and a cover, the step pad concealed by the cover when the deployable step assembly is in the stowed position, the step pad establishing a step surface when the deployable step assembly is in the deployed position.

17. The vehicle of claim 1, further comprising a biasing device that damps pivoting of the deployable step assembly from the stowed position to the deployed position and that assists pivoting of the deployable step assembly from the deployed position to the stowed position.

18. A method, comprising:

pivoting a deployable step assembly of a vehicle to transition the deployable step assembly from a stowed position and a deployed position, wherein, in the stowed position, a step pad of the deployable step assembly establishes a portion of a bumper of the vehicle, wherein, in the deployed position, the step pad is rearward and vertically lower than the bumper.

19. The method of claim 18, further comprising covering a light with the deployable step assembly when the deployable step assembly is in the stowed position, the light illuminating at least a portion of the deployable step assembly when the deployable step assembly is in the deployed position.

20. A vehicle, comprising:

a bumper having a bumper step and a bumper pocket outboard of the bumper step;

a hitch tube extending in a cross-width direction of the vehicle and forming a component of a vehicle body of the vehicle;

a collar bracket disposed about the hitch tube and secured to the hitch tube by at least one mechanical fastener; and a deployable step assembly pivotably coupled to the collar bracket and pivotable between a stowed position in which a step pad of the deployable step assembly is received within the bumper pocket and the deployable step assembly spans over the at least one mechanical fastener, and a deployed position in which the step pad is rearward and vertically lower than the bumper.

* * * * *